Nov. 29, 1955     C. L. HALLER     2,725,453
HEATING APPARATUS

Filed April 8, 1952     2 Sheets—Sheet 1

WITNESSES:

INVENTOR
CLAYTON L. HALLER
BY
ATTORNEY

Nov. 29, 1955    C. L. HALLER    2,725,453
HEATING APPARATUS
Filed April 8, 1952    2 Sheets-Sheet 2

WITNESSES:

INVENTOR
CLAYTON L. HALLER
BY
ATTORNEY

United States Patent Office 2,725,453
Patented Nov. 29, 1955

2,725,453

HEATING APPARATUS

Clayton L. Haller, Mansfield, Ohio, assignor to Westinghouse Electric Corporation, East Pittsburgh, Pa., a corporation of Pennsylvania Application April 8, 1952, Serial No. 281,187

10 Claims. (Cl. 219—25)

This invention relates to thermostatically controlled electric pressing irons. More particularly, it relates to such pressing irons in which the soleplate is heated by a rod-like sheathed electrical resistance heating unit.

Many pressing irons marketed at the present time are provided with a cast metal soleplate and utilize a sheathed heating unit for heating the soleplate, the energization of the heating unit being controlled by a manually adjustable thermostat mounted on the soleplate. It has also been the practice to provide a considerably greater concentration of heat in the toe portion of the soleplate than in the rest of the soleplate. In at least one prior construction, the wattage per square inch in the toe portion has been twice as great as the wattage per square inch of the rest of the soleplate.

Although irons utilizing a sheathed heating unit have been generally satisfactory, prior to my invention, those irons having a cast iron soleplate have been subject to excessive over-travel of temperature on the first operating cycle; that is, the temperature attained by the soleplate on the first operating cycle would exceed the temperature for which the thermostat was set. Also, the temperature differential of the soleplate has been rather wide; that is, the temperature of the soleplate has fluctuated between undesirably wide limits for any particular setting of the thermostat. These effects have been caused chiefly by the relatively poor heat conductance of cast iron which in turn created excessive heat lag. Excessive heat lag prevented the thermostat from following the temperature of the soleplate closely. Since aluminum has a higher rate of heat conductivity than cast iron, the heat lag of an aluminum soleplate is relatively low and is not of serious consequence.

In view of the above, it is an object to provide an electrically heated pressing iron having a cast iron soleplate and a thermostatic control, in which the temperature of the soleplate is more closely regulated by the thermostat on the first operating cycle.

Another object is to provide an electrically heated and thermostatically controlled pressing iron having a cast iron soleplate, in which the soleplate has a low operating temperature differential.

A more specific object is to provide a thermostatically controlled pressing iron having a cast iron soleplate and a sheathed heating unit for heating the soleplate, which iron has a low over-travel on the first heating cycle and a smaller temperature differential than heretofore.

A further object is to attain the above objects in a simple and inexpensive manner.

In accordance with the above objects, I provide a pressing iron having a sheathed heating unit pressed into or otherwise attached to a cast iron soleplate. The sheathed heating unit is provided with a wound wire electrical resistance heating element distributed throughout its length. The heating unit is substantially U-shaped with its bight facing the heel of the iron, and the thermostat is mounted on the soleplate, in a central position, within the bight of the heating unit. Adjacent the thermostat, the heating element is provided with a larger number of turns or coils per unit of length than at other portions of the heating unit, thereby providing a greater portion of the total heat available, than heretofore, for heating the thermostat. With the heating element thus having a greater concentration adjacent the thermostat, the thermostat will open the circuit through the heating unit sooner than it would with the conventional sheathed heating unit. Also, the temperature differential of the soleplate is reduced, since the thermostat will respond more quickly to heat transmitted by the heating unit.

After suitable tests, I have found that, in practicing my invention, the average wattage per unit of surface of the soleplate in the area adjacent the thermostat may lie within the limits of 94% and 220% of the average wattage per unit of ironing surface area of the entire soleplate.

I have also found that the wattage per unit length of the portion of the heating unit disposed adjacent the thermostat may lie within the limits of 110% and 175% of the average wattage per unit length of the entire heating unit.

Since wattage per unit length or wattage per unit area is directly proportional to the electrical resistance of the heater for the same unit length or area, such wattage ratios expressed herein as percentages of total wattage or of average wattage also define the ratios of electrical resistance per unit length or electrical resistance per unit area, respectively, with respect to total resistance or to average resistance. All references to soleplate surface areas herein pertain to areas of ironing surface.

These and other objects are effected by my invention as will be apparent from the following description taken in connection with the accompanying drawings, forming a part of this application, in which.

Figure 1:
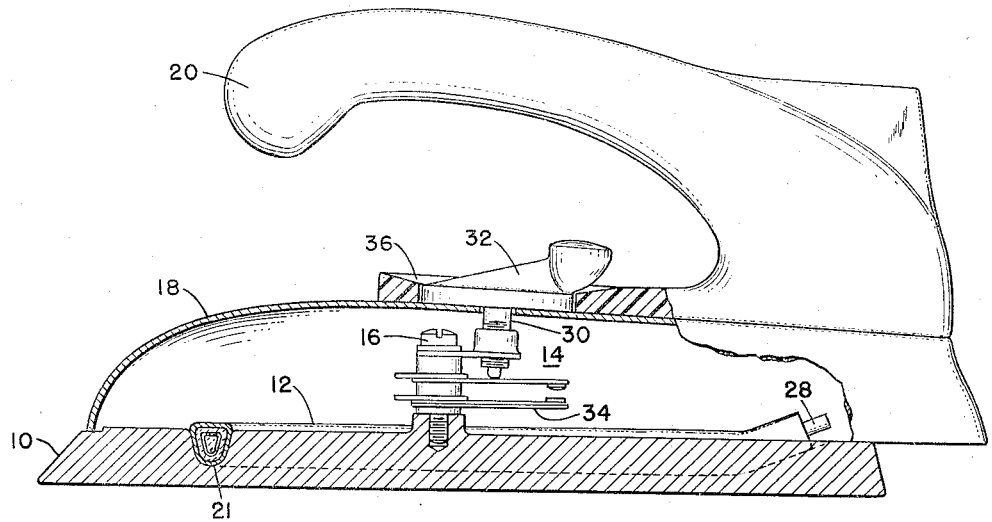
Fig. 1 is a side elevation, with portions in section to show details, of a thermostatically controlled pressing iron incorporating my invention.
Figure 2:
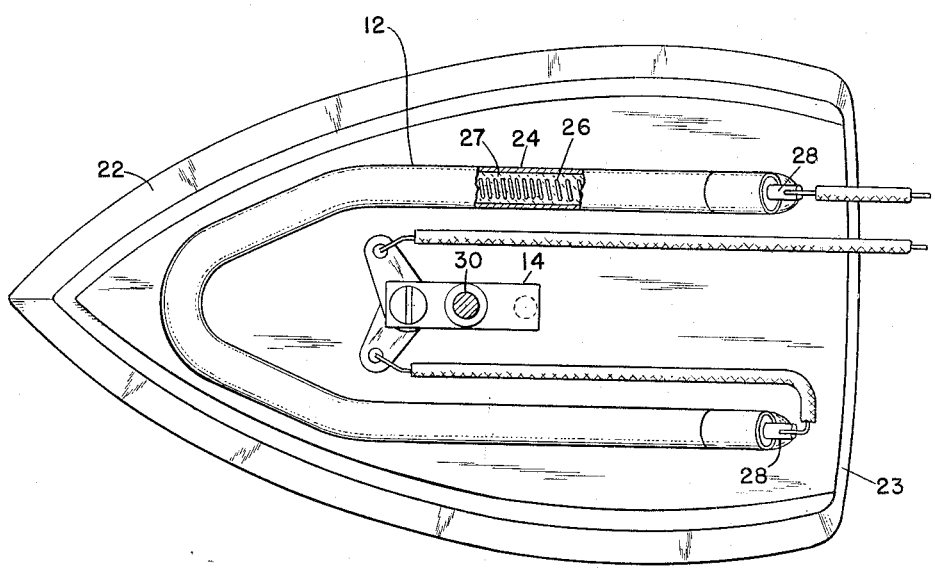
Fig. 2 is a plan of the soleplate having the heating unit and the thermostat mounted thereon.

Referring to the drawings in detail, especially Figs. 1 and 2, there is shown an electrically heated pressing iron having a metallic soleplate 10, an elongated sheathed heating unit 12 mounted on said soleplate and a bimetal thermostat 14 mounted on the soleplate in a substantially central position by a screw 16.

The iron is further provided with a cover member 18 disposed above and fastened to the soleplate 10 in any desirable manner. The iron is also provided with a manipulating handle 20 composed of a heat insulating material such as phenolic resin or the like.

The heating unit 12 may be fastened to the soleplate 10 in any desirable manner; for example, I have shown it as being pressed into a groove 21. The soleplate 10 may be formed in any desirable manner. In accordance with the usual practice, it is of cast metal and is of conventional shape having a pointed toe portion 22 and a blunt heel portion 23. The invention is especially advantageous when the soleplate is made of ferrous metal, and in the embodiments shown in Figs. 3 and 4, the soleplate is of cast iron.

The heating unit 12 includes a tubular sheath 24 within which is centrally disposed a coiled wire electrical resistance heating element 26. The heating element is insulatedly spaced from the sheath 24 by a highly compacted refractory powder 27 and extends substantially throughout the length of the sheath 24. The heating unit 12 is U-shaped in plan, with its bight facing rearwardly, and extends the full length of the soleplate from front to rear. The ends of the heating element 26 are disposed in the heel portion 23 of the soleplate and are connected to terminals 28 for wiring connections, as well known in the art.

The thermostat 14 may be of any conventional adjustable type having a pair of movable contacts for making and breaking the circuit through the heating unit 12. In the form shown, one of the contacts is adjustable by a threaded screw member 30, which extends upwardly through an opening in the cover 18 and is received in an adjusting knob 32. The other contact is carried by a bimetallic arm 34 which moves downwardly (as shown in Fig. 1) when heated, to open the circuit, and upwardly when cooled, to restore the circuit through the heating unit 12.

The knob 32 is rotatable to a plurality of temperature positions which may be indicated by appropriate indicia (not shown) provided on a stationary dial member 36 encircling the knob 32.

Figure 3:
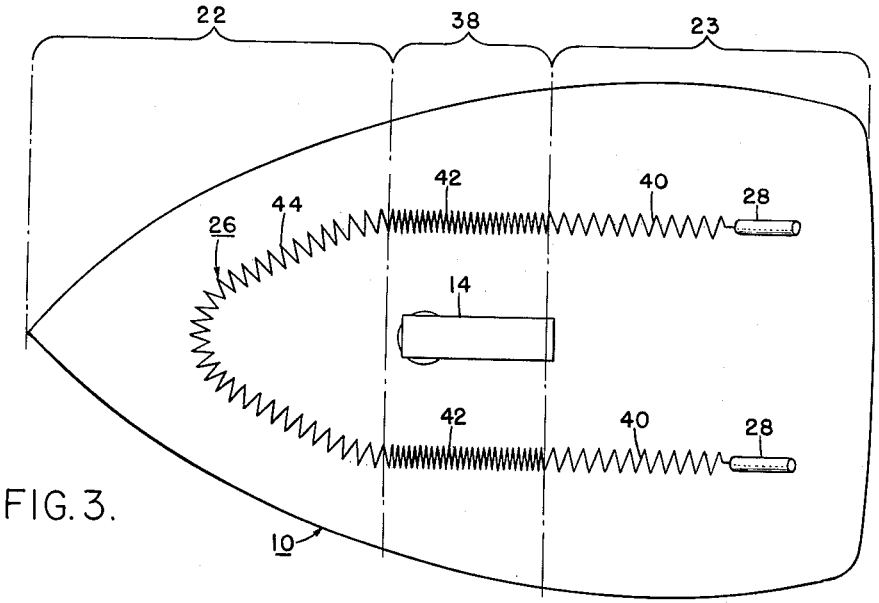
Fig. 3 is a schematic view showing the distribution of the heating element and its general arrangement in the soleplate.

Fig. 3 is a schematic diagram showing one arrangement of the heating element 26 in relation to the soleplate 10. Physical dimensions of the soleplate and of the heating unit are not standardized in the art and vary with different manufacturers. However, to clearly illustrate the invention, certain physical dimensions and wattage values will be considered, it being understood that the invention may be utilized with pressing irons of other physical dimensions and wattage values.

The soleplate 10 has a length of 7 5/8 inches, a width of 4 3/8 inches and an ironing surface area of 25.75 square inches. The heating unit has a wattage rating of 1000 watts, hence the average wattage per square inch of ironing area is 1000/25.75 or 38.8 w. For purposes which will subsequently be described, the soleplate may be considered as being theoretically divided into three portions, namely, the toe portion 22 having an area of 7 square inches, the heel portion 23 having an area of 12.75 square inches and a central portion 38 disposed between the toe and heel portions and having an area of 6 square inches.

The length of the coiled heating element 26 is 10 inches when measured between the terminals 28 along the axis of the sheath 24; hence, the effective length of the heating unit 12 is also 10 inches and the average wattage per effective linear inch of heating unit is 1000/10 or 100. The effective length of the heating unit will be hereinafter referred to as the length of the heating unit, for simplicity.

In accordance with the teachings of my invention, the coiled heating element 26, prior to assembly in the sheath 24, is non-uniformly coiled to provide more wattage per linear inch of heating unit at those portions of the heating unit disposed within the central portion 38 of the soleplate than at the toe and heel portions 22 and 23, respectively. In production, the heating element may be first uniformly coiled and then stretched to attain the desired wattage variation.

The heating element 26 has a pair of rear heating portions 40 disposed in the heel portion 23, a pair of central heating portions 42 disposed in the central portion 38 of the soleplate and a front heating portion 44 disposed in the toe portion 22.

Each of the rear heating portions 40 has a coiled length of 1½ inches and a wattage of 76.16 w. per linear inch. The heel portion 23 is thus provided with a total wattage of 228.48 w., and its wattage per square inch of surface is 228.48/12.75 or 17.9 w.

Each of the central heating portions 42 has a coiled length of 1½ inches and a wattage of 162 w. per linear inch. The central portion 38 is thus provided with a total wattage of 486 w., and its wattage per square inch of surface is 486/6 or 81 w.

The front heating portion 44 has a coiled length of 4 inches and a wattage of 71.4 w. per inch. The toe portion 22 is thus provided with a total wattage of 285.6 w., and its wattage per square inch of surface is 285.6/7 or 40.8 w.

It will be seen from the above that, of the three portions of the soleplate, the central portion 38 is provided with the greatest ratio of wattage per square inch to the average wattage per square inch of the entire soleplate, namely, 81 w./38.8 w. or 209% of the average wattage per square inch. The heel portion is provided with 17.9 w./38.8 w. or 46.2% of the average wattage per square inch, while the toe portion is provided with 40.8 w./38.8 w. or 111% of the average wattage per square inch.

The wattage per linear inch of heating unit in the central portion is 162 w./100 w. or 162% of the average wattage per inch of heating unit. In the rear portion, it is 76.16 w./100 w. or 76.16% of the average wattage per linear inch of heating unit. In the toe portion, it is 71.4 w./100 w. or 71.4% of the average wattage per linear inch of heating unit.

When the heating unit 12 is energized, the central portion 38 of the soleplate, due to its preponderance of wattage, heats at a more rapid rate than the toe or the heel portion and heats the thermostat 14 more rapidly than heretofore, the latter being in good thermal contact with the central portion. Since the thermostat 14 heats at a more rapid rate than heretofore, the thermostat will open sooner and interrupts the energization of the heating unit as the average temperature of the soleplate attains a temperature nearer to the control temperature for which the thermostat knob 32 is set. Overtravel of the average temperature of the soleplate on the first heating cycle is maintained within 15° F. of the control temperature. The temperature differential of the soleplate is 10° F. That is, the average temperature of the soleplate is held within 5° F. of the control temperature as the thermostat makes and breaks the circuit.

The figures and proportions given in connection with the first embodiment, described above, are the design or preferred values. However, as well understood in the art, some variations do occur in production.

I have found that, with the embodiment shown in Fig. 3, the minimum and maximum limits of the heating values of the central portion 38 are as follows:

| | Minimum | Maximum |
|---|---|---|
| Percent of Av. w/in. of heating unit | 150 | 175 |
| Percent of Av. w/sq. inch of soleplate | 197 | 220 |

It will be noted that the above values lie in the upper portion of the range of limits given previously in connection with the statement of invention.

The following criteria are also specifically applicable to this embodiment. The average wattage per unit area of the central portion 38 lies within the limits of 179% and 220% of the average wattage per unit area of the toe portion 22. Or by a slightly different analysis, the wattage per unit length of the portion of the heating unit disposed in the central portion 38 lies within the limits of 194% and 265% of the wattage per unit length of the portion of heating unit disposed in the toe portion 22.

Figure 4:
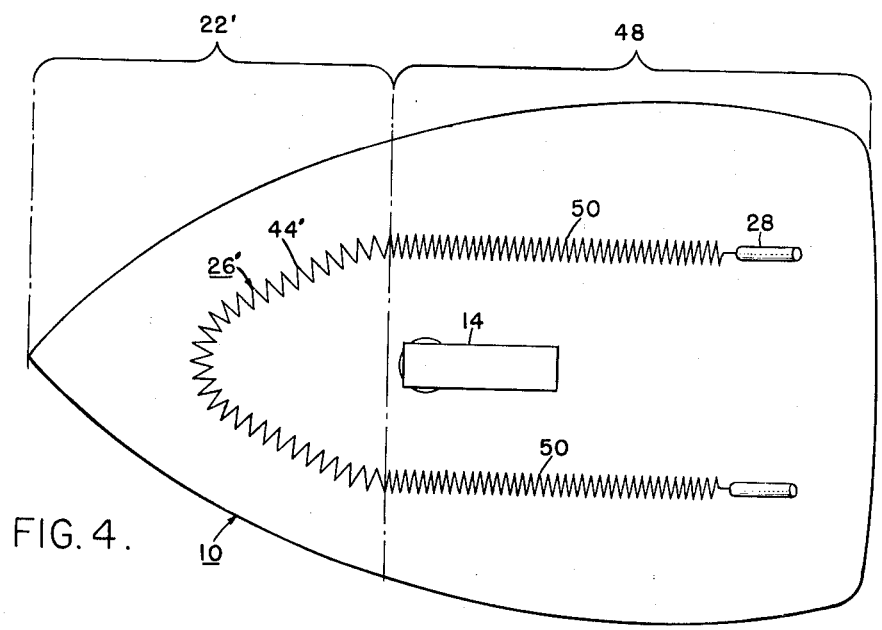
Fig. 4 is a schematic view showing a modified arrangement.

*Fig. 4*

Fig. 4 is a schematic diagram illustrating another embodiment of my invention. The structure of the iron may be the same as shown in Figs. 1 and 2, the only difference residing in the arrangement of a heating element 26' in relation to the soleplate 10.

The soleplate 10, in this embodiment, is considered as being divided into two portions, namely a toe portion 22' having an area of 7 square inches and a main portion 48 having an area of 18.75 square inches.

The heating element is non-uniformly coiled to provide more wattage per linear inch of heating unit in the main portion of the soleplate than in the toe portion of the soleplate. The heating element has a pair of rear heating portions 50 disposed in the main portion 48 and a front heating portion 44′ disposed in the toe portion 22′.

Each of the rear heating portions 50 has a coiled length of 3 inches and a wattage of 119 w. per linear inch, thereby providing a total wattage of 714 w. in the main portion of the soleplate. The wattage per square inch of surface is 714 w./18.75 square inch or 38.2 w.

The wattage per linear inch of heating unit in the main portion 48 is 119 w./100 w. or 119% of the average wattage per inch of heating unit. The wattage per square inch of surface is 38.2 w./38.8 w. or 98.4% of the average wattage per square inch of the entire soleplate. It is to be noted that the thermostat 14 is disposed adjacent the forward portion of the heating portions 50. The heating effect in this area is greatest, since the area is closely embraced by the rear heating portions 50 and the front heating portion 44′.

The front heating portion 44′ has a coiled length of 4 inches and a wattage of 71.4 w. per linear inch. The front heating portion 44′ is substantially of the same value as the front heating portion 44 of Fig. 3. The toe portions 22′ and 22 of the two embodiments are also of the same surface area. Thus, the toe portion 22′ is provided with 285.6 w. and the wattage per square inch is 40.8 w. Similarly, the wattage per linear inch of heating unit in the toe portion is 71.4% of the average wattage per inch of the entire heating unit, and the wattage per square inch of the toe portion is 105% of the average wattage per square inch of the entire soleplate.

I have found that, with the embodiment shown in Fig. 4, the minimum and maximum limits of the heating values of the main portion 48 are as follows:

|  | Minimum | Maximum |
| --- | --- | --- |
| Percent of Av. w/in. of heating unit | 110 | 129 |
| Percent of Av. w/sq. in. of soleplate | 94 | 104 |

It will be noted that these values lie in the lower portion of the range of limits given previously in connection with the statement of invention.

The effect of the rear heating portions 50 on the thermostat is similar to the effect of the central heating portions 42 described in conjuncion with Fig. 3. Although the concentration of the heating element in Fig. 4 is not as great as that of Fig. 3 adjacent the thermostat, more heat is provided in the heel portion of the soleplate than in the arrangement shown in Fig. 3.

With the arrangement shown in Fig. 4, over-travel of the average temperature of the soleplate on the first heating cycle is maintained within 35° F. of the control temperature, while the subsequent temperature differential of the soleplate is maintained within 5° F. Although the temperature over-travel with this embodiment is slightly higher than that attained with the first embodiment it is, nevertheless, a substantial reduction in the over-travel attained with irons made in accordance with the prior art. The advantages of this embodiment reside chiefly in the simplicity of manufacture, since it is merely necessary to stretch the heating element at the toe portion of the iron before insertion into the sheath.

While I have shown my invention in several forms, it will be obvious to those skilled in the art that it is not so limited, but is susceptible of various other changes and modifications without departing from the spirit thereof.

What I claim is:

1. A pressing iron having a ferrous metal soleplate, an elongated tubular sheathed heating unit of U-shaped outline disposed in said soleplate, said heating unit having a coiled wire heating element distributed throughout its length, a manipulating handle disposed above said soleplate and a thermostat for controlling the operating temperatures of said soleplate; said soleplate having a toe portion terminating in a point and having a heel portion, said heating unit extending from said heel portion to said toe portion and being disposed with its bight facing said heel portion, said thermostat being mounted on said soleplate within the bight of said heating unit, said heating element being so distributed in said heating unit that the electrical resistance per unit length of the portion of said heating unit disposed adjacent said thermostat lies within the limits of 110 per cent and 175 per cent of the average electrical resistance per unit length of said heating unit.

2. A pressing iron having a ferrous metal soleplate, an elongated tubular sheathed heating unit of U-shaped outline disposed in said soleplate, said heating unit having a coiled wire heating element distributed throughout its length, a manipulating handle disposed above said soleplate and a thermostat for controlling the operating temperatures of said soleplate; said soleplate having a toe portion terminating in a point and having a heel portion, said heating unit extending from said heel portion to said toe portion and being disposed with its bight facing said heel portion, said thermostat being mounted on said soleplate within the bight of said heating unit, said heating element being so distributed in said heating unit that the average electrical resistance per unit of surface area of said soleplate adjacent said thermostat lies within 94 per cent and 220 per cent of the average electrical resistance per unit of surface area of the entire soleplate.

3. A pressing iron having a ferrous metal soleplate, an elongated tubular sheathed heating unit of U-shaped outline disposed in said soleplate, said heating unit having a coiled wire heating element distributed throughout its length, a manipulating handle disposed above said soleplate and a thermostat for controlling the operating temperatures of said soleplate, said soleplate having a toe portion terminating in a point and having a heel portion, there being a central portion disposed intermediate said toe and said heel portions, said thermostat being mounted on said central portion and said heating element extending from said heel portion to said toe portion and having its terminal portions disposed in said heel portion, said heating element being so distributed in said heating unit that the electrical resistance per unit length of the portion of said heating unit disposed in said central portion of the soleplate lies within 194 per cent and 265 per cent of the electrical resistance per unit length of the portion of said heating unit disposed in said toe portion.

4. A pressing iron having a ferrous metal soleplate, an elongated tubular sheathed heating unit of U-shaped outline disposed in said soleplate, said heating unit having a coiled wire heating element, a manipulating handle disposed above said soleplate and a thermostat for controlling the operating temperatures of said soleplate, said soleplate having a toe portion terminating in a point and having a heel portion, there being a central portion disposed intermediate said toe and said heel portions, said thermostat being mounted on said central portion, said heating element having its terminal portions disposed in said heel portion, and extending forwardly through said soleplate into said central and said toe portions, said heating element being so distributed in said heating unit that the electrical resistance per unit length of the portion of said heating unit disposed in said central portion of the soleplate lies within the limits of 110 per cent and 175 per cent of the average electrical resistance per unit length of said heating unit.

5. A pressing iron having a ferrous metal soleplate, an elongated tubular sheathed heating unit of U-shaped outline disposed in said soleplate, said heating unit having a coiled wire heating element, a manipulating handle disposed above said soleplate and a thermostat mounted on said soleplate for adjusting the operating temperature of said soleplate, said soleplate having a toe portion terminating in a point, a heel portion and a central portion disposed intermediate said heel and toe portions, said thermostat being mounted on said central portion adjacent said toe portion and said heating element being so distributed in said heating unit that the average electrical resistance per unit of surface area of said central portion lies within the limits of 94 per cent and 220 per cent of the average electrical resistance per unit of surface area of the entire soleplate.

6. A pressing iron having a ferrous metal soleplate, an elongated tubular sheathed heating unit of U-shaped outline disposed in said soleplate, said heating unit having a coiled wire heating element distributed throughout its length, a manipulating handle disposed above said soleplate and a thermostat for controlling the operating temperatures of said soleplate, said soleplate having a toe portion and a main portion, said heating unit extending from said main portion into said toe portion, said thermostat being mounted on said main portion within the bight of said heating unit, said heating element being so distributed in said heating unit that the average electrical resistance per unit of surface area of said soleplate in said main portion lies within the limits of 94 per cent and 104 per cent of the average electrical resistance per unit of surface area of the entire soleplate.

7. A pressing iron having a ferrous metal soleplate, an elongated tubular sheathed heating unit of U-shaped outline disposed in said soleplate, said heating unit having a coiled wire heating element distributed throughout its length, a manipulating handle disposed above said soleplate and a thermostat for controlling the operating temperatures of said soleplate, said soleplate having a toe portion and a main portion, said heating unit extending from said main portion into said toe portion, said thermostat being mounted on said main portion within the bight of said heating unit, said heating element being so distributed in said heating unit that the electrical resistance per unit length of the portion of said heating unit disposed in said main portion of said soleplate is within the limits of 110 per cent and 129 per cent of the average electrical resistance per unit length of the entire heating unit.

8. A pressing iron having a ferrous metal soleplate, an elongated tubular sheathed heating unit of U-shaped outline disposed in said soleplate, said heating unit having a coiled wire heating element distributed throughout its length, a manipulating handle disposed above said soleplate and a thermostat for controlling the operating temperatures of said soleplate, said soleplate having a toe portion terminating in a point and having a heel portion, there being a central portion disposed intermediate said toe and said heel portions, said thermostat being mounted on said central portion and said heating element extending from said heel portion to said toe portion and having its terminal portions disposed in said heel portion, said heating element being so distributed in said heating unit that the electrical resistance per unit length of the portion of said heating unit disposed in said central portion of the soleplate lies within the limits of 150 per cent and 175 per cent of the electrical resistance per unit length of the entire heating unit.

9. A pressing iron having a ferrous metal soleplate, an elongated tubular sheathed heating unit of U-shaped outline disposed in said soleplate, said heating unit having a coiled wire heating element distributed throughout its length, a manipulating handle disposed above said soleplate and a thermostat for controlling the operating temperatures of said soleplate, said soleplate having a toe portion terminating in a point and having a heel portion, there being a central portion disposed intermediate said toe and said heel portions, said thermostat being mounted on said central portion and said heating element extending from said heel portion to said toe portion and having its terminal portions disposed in said heel portion, said heating element being so distributed in said heating unit that the average electrical resistance per unit of surface area of said central portion lies within 197 per cent and 220 per cent of the average electrical resistance per unit of surface area of the entire soleplate.

10. A pressing iron having a ferrous metal soleplate, an elongated heating unit of U-shaped outline disposed in said soleplate, said heating unit having a coiled wire heating element located in a tubular metal sheath and electrically insulated therefrom, a manipulating handle disposed above said soleplate and a thermostat for controlling the operating temperature of said soleplate, said soleplate having a toe portion terminating in a point and having a heel portion, there being a central soleplate portion disposed intermediate said toe and heel portions, said thermostat being mounted on said central portion, said heating element having its terminal portions disposed in said heel portion, said heating unit extending forward through said soleplate into said central and toe portions, said heating element being so distributed in said heating unit that its electrical resistance per unit length adjacent said thermostat within said central portion is greater than its electrical resistance per unit length in either said toe portion or said heel portion.

References Cited in the file of this patent

UNITED STATES PATENTS

| Number | Name | Date |
|---|---|---|
| 1,533,230 | Colby | Apr. 14, 1925 |
| 2,154,042 | Gough | Apr. 11, 1939 |
| 2,201,115 | Reingruber et al. | May 14, 1940 |
| 2,367,985 | Weeks | Jan. 23, 1945 |
| 2,385,606 | Campbell | Sept. 25, 1945 |
| 2,409,420 | Clark | Oct. 15, 1946 |
| 2,499,961 | Lennox | Mar. 7, 1950 |
| 2,528,254 | Swenson | Oct. 31, 1950 |